United States Patent
Koshikawa et al.

(10) Patent No.: US 6,832,411 B2
(45) Date of Patent: Dec. 21, 2004

(54) HINGE DEVICE

(75) Inventors: Shinichiro Koshikawa, Yokaichiba (JP); Akira Sasaki, Saitama (JP); Hiroshi Sudo, Gyoda (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 0 days.

(21) Appl. No.: 10/333,098

(22) PCT Filed: Feb. 27, 2002

(86) PCT No.: PCT/JP02/01777

§ 371 (c)(1),
(2), (4) Date: Jan. 15, 2003

(87) PCT Pub. No.: WO02/069683

PCT Pub. Date: Sep. 6, 2002

(65) Prior Publication Data

US 2004/0025297 A1 Feb. 12, 2004

(30) Foreign Application Priority Data

Feb. 28, 2001 (JP) .................................. 2001-054684

(51) Int. Cl.[7] ............................................ E05D 11/10
(52) U.S. Cl. ............................ 16/330; 16/321; 16/303; 16/324
(58) Field of Search ..................... 16/277, 297, 319, 16/321, 330, 303, 307, 334, 342

(56) References Cited

U.S. PATENT DOCUMENTS

| | | | | |
|---|---|---|---|---|
| 6,125,507 A | * | 10/2000 | Katoh | 16/329 |
| 6,305,050 B1 | | 10/2001 | Imai | 16/303 |
| 6,658,699 B2 | * | 12/2003 | Huong | 16/330 |
| 6,704,418 B1 | * | 3/2004 | Koshikawa | 379/443.13 |
| 2003/0009851 A1 | * | 1/2003 | Oshima et al. | 16/334 |
| 2003/0056325 A1 | * | 3/2003 | Koshikawa et al. | 16/334 |
| 2003/0101538 A1 | * | 6/2003 | Koshikawa | 16/277 |

FOREIGN PATENT DOCUMENTS

| | | | |
|---|---|---|---|
| EP | 1 103 688 A2 | 5/2001 | |
| JP | 57-123468 | 7/1982 | |
| JP | 61-128418 | 8/1986 | |
| JP | 03147993 A * | 6/1991 | ............. E05F/3/14 |
| JP | 07-011831 | 1/1995 | |
| JP | 11-050727 | 2/1999 | |

* cited by examiner

*Primary Examiner*—Heather Shackelford
*Assistant Examiner*—Michael J. Kyle
(74) *Attorney, Agent, or Firm*—Brown & Michaels, PC; Eugene Stephens & Associates

(57) ABSTRACT

Abutment projections (54, 54) of a resin-made driver member (not shown) are inserted in the opposite end portions of a key groove (41) of a metal-made turnable member (4) in the circumferential direction. A key portion (B3) of a receiving cylindrical portion is inserted between the abutment projections (54, 54). The interval between the abutment projections (54, 54) in the circumferential direction is set to be slightly larger than the width of the key portion (B3). By doing so, when a transmission section is turned into an open position or a closed position, the abutment projections (54, 54) and the key portion (B3) are collided with each other, thereby generating a click sound. Moreover, since both the abutment projections (54, 54) and the key portion (B3) are formed of resin, they can be prevented from getting worn out soon.

8 Claims, 13 Drawing Sheets

(A)

(B)

(C)

HINGE DEVICE

TECHNICAL FIELD

This invention relates to a hinge assembly which is used for cellular telephones and generates a click sound in a closed position and an open position.

BACKGROUND ART

In general, a hinge assembly used for cellular telephones comprises a hinge main body and a turnable member. The hinge main body and the turnable member are non-turnably connected to a transmission section and a reception section, respectively. But the hinge main body and the turnable member are turnably connected to each other. By this, the transmission section and the reception section of the cellular telephone are turnably connected through the hinge assembly.

The turnable member is caused to abut with the hinge main body by bias means such as a coiled spring or the like. FIGS. 18(A) and 19(A) show abutment surfaces of the hinge main body and the turnable member b, respectively. Three fitting recesses a1, a2, a3 each having a trapezoidal configuration in section are formed in the abutment surface of the hinge main body a at predetermined locations in the circumferential direction. On the other hand, two fitting projections b1, b2 are formed on the abutment surface of the turnable member b. The two fitting projections b1, b2 are fitted in the fitting recesses a1, a2, when the reception section is turned to the vicinity of the closed position, for example (FIG. 18(B) shows a state in which the fitting projection b1 is fitted in the fitting recess a1). Then, the biasing force of the bias means is converted into a turn biasing force by inclination surfaces of the fitting projections b1, b2 and the fitting recesses a1, a2. By this turn biasing force, the reception section is turned into the closed position at a high speed and vigorously collided with the surface of the transmission section. As a consequence, a click sound is generated. On the other hand, when the reception section is turned to the vicinity of the open position, the fitting projections b1, b2 are fitted in the fitting recesses a3, a1, respectively, thereby causing the basal portion of the reception section to collide with the basal portion of the transmission section. Therefore, a click sound is also generated when the reception section is turned into the open position (see Japanese Patent Application Laid-Open No. H07-11831).

In the above-mentioned conventional hinge assembly, if the reception section is turned at a low speed against the biasing force of the bias means when the reception section is turned into the closed position or open position, the reception section is merely contacted with the transmission section and never vigorously collided with the transmission section. Hence, there is such a problem that no click sound is generated.

The present applicant previously proposed a hinge assembly capable of solving the above problem under Japanese Patent Application No. H11-376023 (Japanese Patent Application Laid-Open No. 2001-152728). The hinge assembly according to this proposal comprises a movable member which is non-turnably but movably connected to a hinge main body. The movable member is caused to abut with a turnable member by bias means such as a coiled spring or the like. A fitting recess and a fitting projection are formed at the abutment surfaces of the turnable member and the movable member, respectively. When the reception section arrives at the vicinity of the closed position, the fitting recess and the fitting projection are fitted to each other to thereby convert the biasing force of the bias means into a turn biasing force in the closing direction. On the other hand, when the reception section arrives at the vicinity of the open position, the fitting recess and the fitting projection are fitted to each other to thereby convert the biasing force of the bias means into a turn biasing force in the opening direction. Therefore, if the reception section is located in the vicinity of the closed position or open position, it is rapidly turned to the closed position or open position by the biasing force of the bias means.

An abutment recess and an abutment projection both extending in the circumferential direction about the rotation axes of the transmission section and the reception section, are formed at the reception section and the turnable member, respectively. The abutment recess and the abutment projection are fitted to each other to thereby turn the turnable member following the motion of the reception section. However, the width of the abutment recess in the circumferential direction is set to be slightly larger than the width of the abutment projection in the circumferential direction. Therefore, the turnable member can make a relative turn by a fine angle corresponding to the difference in width between the reception section and the abutment projection with respect to the reception section.

In the hinge assembly thus constructed, when the fitting recess and the fitting projection are fitted to each other by turning the reception section to the vicinity of the closed position or open position, the turnable member is caused to make a rapid turn by a fine angle with respect to the reception section by the bias means. As a consequence, one side surfaces of the abutment recess and the abutment projection in the circumferential direction are collided with each other at a high speed. Accordingly, a click sound can be generated even if the transmission section is turned at a low speed.

In the hinge assembly according to the previous proposal, when the reception section is turned with respect to the transmission section, the movable member relatively turns with respect to the turnable member and the fitting projection of the movable member slidingly contacts on the abutment surface of the turnable member. Accordingly, if the turnable member should be formed of resin, it would probably be worn out soon. Therefore, the turnable member is formed of metal so that it will be prevented from being worn out soon.

However, if the turnable member is to be formed of metal, another problem arises in which the recent requirement for forming the casing of the reception section from resin cannot be met. That is, whenever the reception section is turned into the closed position or open position, the side surface of the abutment recess in the circumferential direction is collided with the abutment projection. At that time, if the turnable member should be made of metal and the reception section should be made of resin, the abutment projection would be worn out soon. For this reason, the casing of the reception section cannot be formed of resin.

DISCLOSURE OF INVENTION

In order to solve the above problems, according to a first aspect of the present invention there is provided a hinge assembly comprises, in order to turnably connect an equipment main body and a cover member between a closed position and an open position, a hinge main body non-turnably connected to one of the equipment main body and the cover member, a turnable member arranged on a rotation axis of the equipment body and the cover member, turnably connected to the other of the equipment main body and the cover member, and turnably connected to the hinge main body, and turn bias means disposed between the hinge main body and the turnable member, the turn bias means biasing, when the cover member is located within a predetermined angular range from the closed position towards the open position side, the turnable member from the open position side towards the closed position side and biasing, when the cover member is located within a predetermined angular range from the open position towards the closed position side, the turnable member from the closed position side towards the open position side, an abutment recess being formed in an outer periphery of the turnable member, an abutment projection, which is to be inserted in the abutment recess, being formed on the other of the equipment main body and the cover member to which the turnable member is connected, wherein a driver member is disposed adjacent to the turnable member in a direction of the rotation axis, a pair of abutment projections for non-turnably connecting the driver member to the turnable member by being collided with opposite side surfaces of the abutment recess in the circumferential direction are formed on the driver member in such a manner as to be away from each other in the circumferential direction about the rotation axis, the abutment projection is inserted between the pair of abutment projections, so that when the turnable member is turned in the closing direction by the turn bias means, one of the pair of abutment projections is abutted with the abutment projection thereby turning the other of the equipment main body and the cover member to which the turning member is connected, towards the closed position side, and when the turnable member is turned in the opening direction by the turn bias means, the other of the pair of abutment projections is abutted with the abutment projection thereby turning the other of the equipment main body and the cover member towards the open position side, at least portions of the pair of abutment projections which are to be collided with the abutment projection, are formed of resin, and an interval between the pair of abutment projections in the circumferential direction is set to be larger by a predetermined small amount than a width of the abutment projection in the circumferential direction.

In order to solve the above problems, according to a second aspect of the present invention, there is provided a hinge assembly comprises, in order to turnably connect an equipment main body and a cover member between a closed position and an open position, a hinge main body non-turnably connected to one of the equipment main body and the cover member, a turnable member arranged on a rotation axis of the equipment body and the cover member, turnably connected to the other of the equipment main body and the cover member, and turnably connected to the hinge main body, and turn bias means disposed between the hinge main body and the turnable member, the turn bias means biasing, when the cover member is located within a predetermined angular range from the closed position towards the open position side, the turnable member from the open position side towards the closed position side and biasing, when the cover member is located within a predetermined angular range from the open position towards the closed position side, the turnable member from the closed position side towards the open position side, a radially projecting abutment projection being formed on an outer periphery of the turnable member, an abutment recess, which allows the abutment projection to be inserted therein, being formed in the other of the equipment main body and the cover member to which the turnable member is connected, wherein a driver member is disposed adjacent to the turnable member in a direction of the rotation axis, a radially projecting support projection is formed on an outer periphery of the driver member and a pair of abutment projections projecting towards the turnable member side and for non-turnably connecting the driver member to the turnable member by being collided with opposite side surfaces of the abutment projection in the circumferential direction are formed on opposite end portions of the support projection in the circumferential direction, the pair of abutment projections are inserted in the abutment recess, so that when the turnable member is turned in the closing direction by the turn bias means, one of the pair of abutment projections is abutted with one side surface of the abutment recess in the circumferential direction thereby turning the other of the equipment main body and the cover member to which the turning member is connected, towards the closed position side, and when the turnable member is turned in the opening direction by the turn bias means, the other of the pair of abutment projections is abutted with the other side surface of the abutment recess thereby turning the other of the equipment main body and the cover member towards the open position side, at least portions of the pair of abutment projections which are to be collided with the side surfaces of the abutment recess, are formed of resin; and an interval between the side surfaces of the pair of abutment projections which are away from each other in the circumferential direction is set to be smaller by a predetermined small amount than a width of the abutment recess in the circumferential direction.

In the first and second aspects of the present invention, it is preferred that entirety of the driver member is formed of resin.

It is also preferred that the turn bias means comprises a movable member placed opposite the turnable member and disposed at the hinge main body such that the movable member is non-turnable but movable in a direction of the rotation axis and bias means for causing the movable member to abut with the turnable member, a first cam portion for converting the biasing force of the bias means into a turn biasing force for turning the turnable member from the open position side to the closed position side when the cover member is located within a predetermined angular range from the closed position towards the open position side and a second cam portion for converting the biasing force of the bias means into a turn biasing force for turning the turnable member from the closed position side to the open position side when the cover member is located within a predetermined angular range from the open position towards the closed position side are disposed between the turnable member and the movable member.

BRIEF DESCRIPTION OF DRAWINGS

FIG. 9(A) is a plan view thereof, FIG. 9(B) is a sectional view taken on line B—B of FIG. 9(A), FIG. 9(C) is an enlarged sectional view taken FIG. 9(A), and FIG. 9(D) is an enlarged view showing the portion indicated by D of FIG. 9(B).

FIG. 12(A) is a plan view showing a state in which a reception section is located in an open position, FIG. 12(B) is a side view thereof, and FIG. 12(C) is an enlarged view of the portion indicated by C of FIG. 12(B).

FIG. 18(A) is a plan view thereof, and FIG. 18(B) is a sectional view taken on line B—B of FIG. 18(A).

FIG. 19(A) is a plan view thereof, and FIG. 19(B) is a sectional view taken on line B—B of FIG. 19(A).

BEST MODE FOR CARRYING OUT THE INVENTION

Embodiments of the present invention will be described hereinafter with reference to FIGS. 1 through 17, in which a hinge assembly according to the present invention is applied to a cellular telephone. It should be noted that the hinge assembly according to the present invention can also be used for other equipments than the cellular telephone by being disposed between an equipment main body and a cover member which can be turningly moved between a closed position and an open position.

Figure 10:
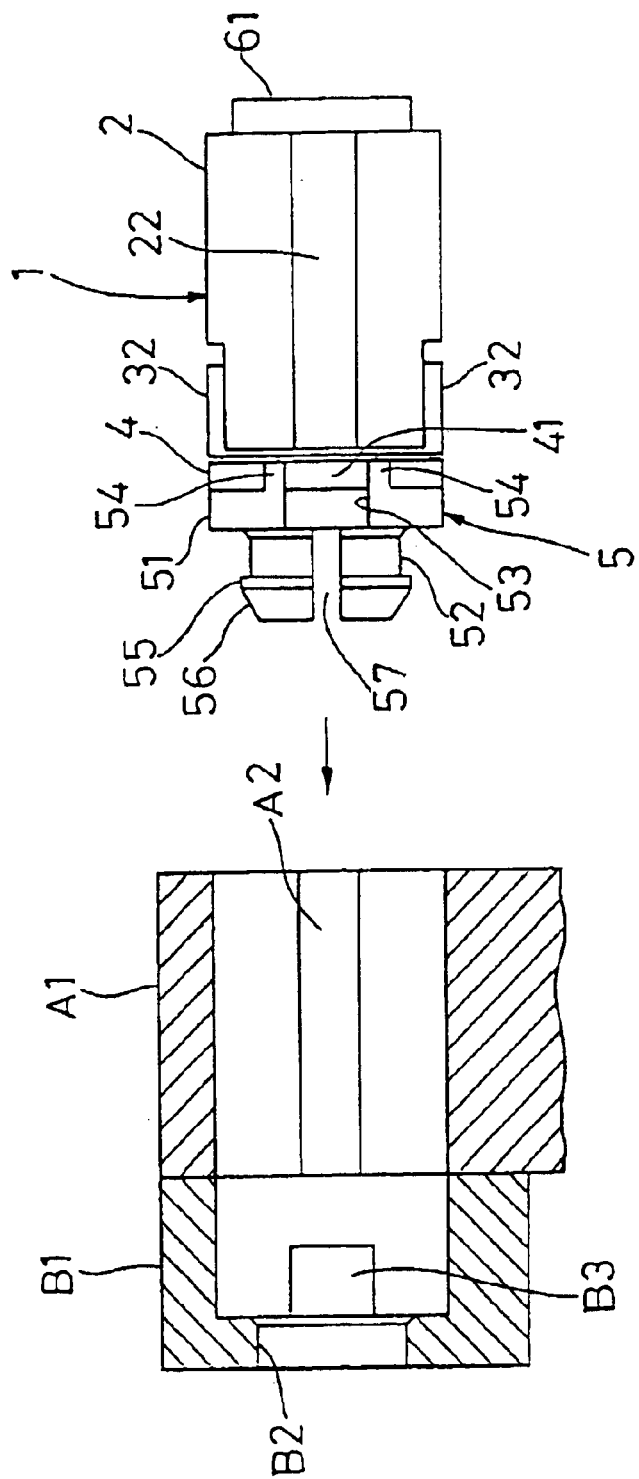
FIG. 10 is a sectional view of the insertion cylindrical portion and a front view of the hinge assembly, showing a before-insertion state of the hinge assembly with respect to the insertion cylindrical portion of a cellular telephone.
Figure 11:
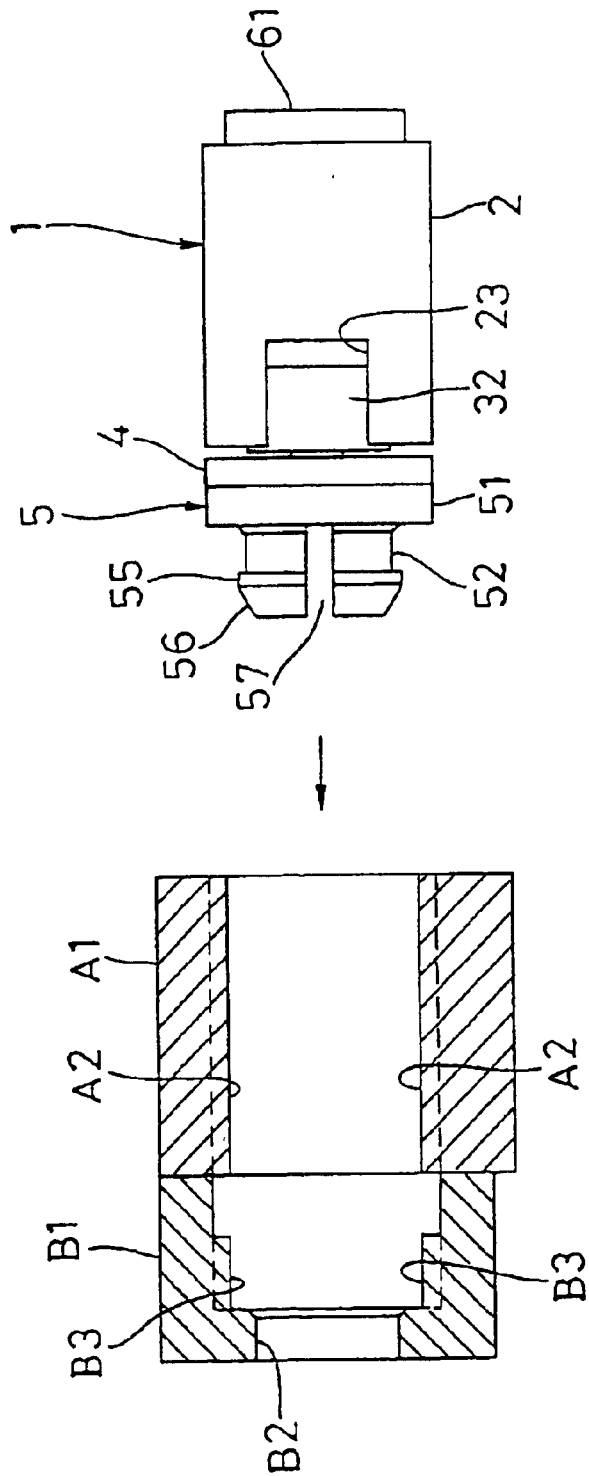
FIG. 11 is a sectional view of the insertion cylindrical portion and a plan view of the hinge assembly, showing an before-insertion state of the hinge assembly with respect to the insertion cylindrical portion of a cellular telephone.
Figure 12:
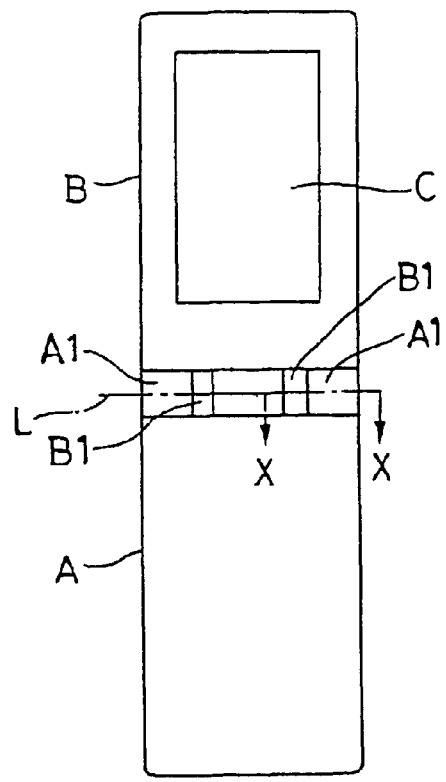
FIG. 12 is an illustration showing a cellular telephone in which the hinge assembly according to the present invention is used.
Figure 12:
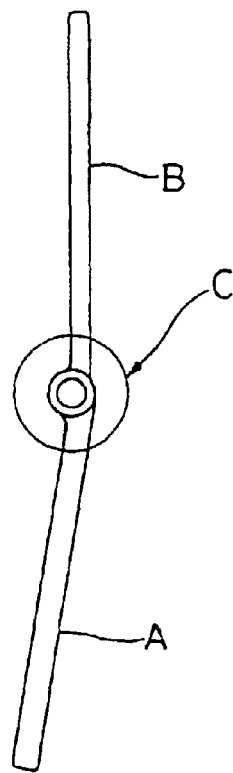
Figure 12:
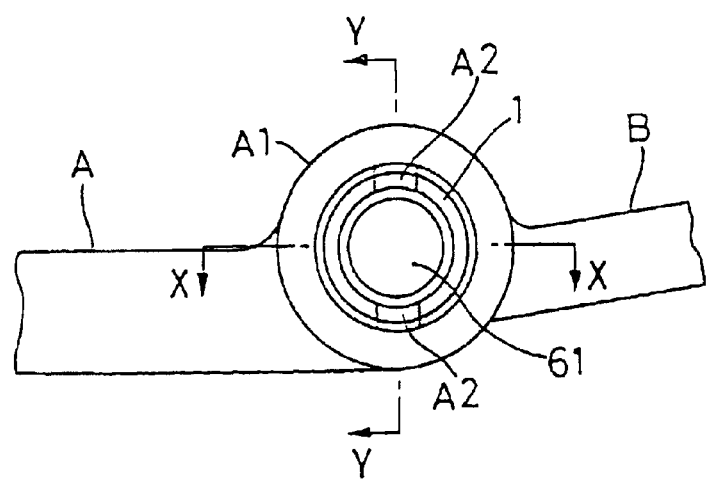
Figure 13:
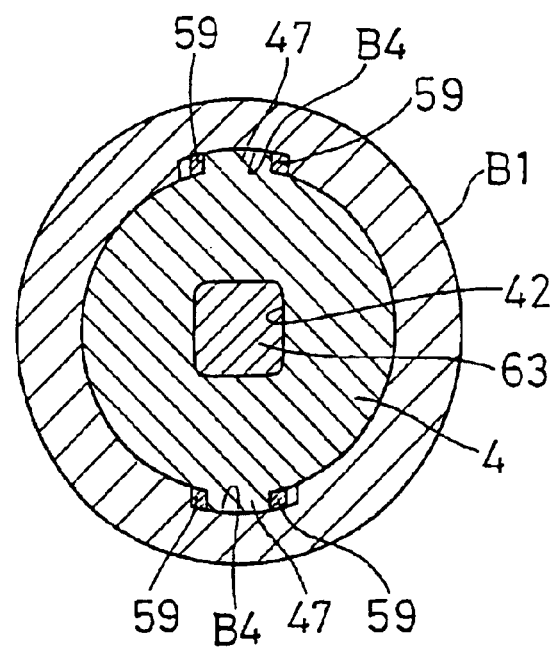
FIG. 13 is a view showing one embodiment according to a second aspect of the present invention and is a sectional view like FIG. 1.
Figure 14:
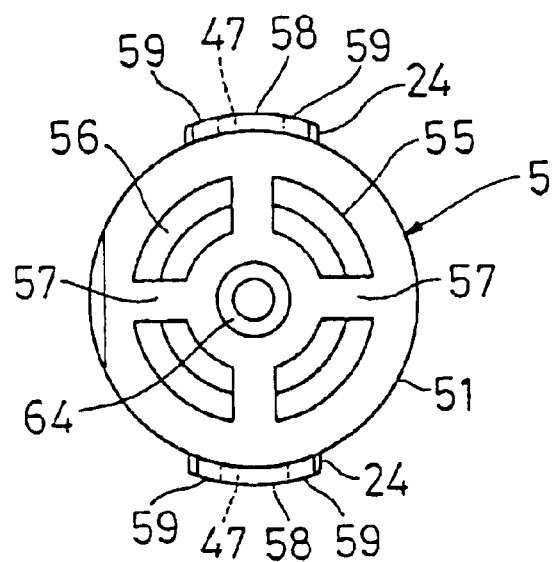
FIG. 14 is a view, like FIG. 5, showing the above embodiment.

FIGS. 1 through 12 show one embodiment according to a first aspect of the present invention. FIG. 12 shows a cellular telephone in which a hinge assembly 1 according to the present invention is used. This cellular telephone includes a transmission section (equipment main body) A which is provided with a microphone, various control buttons (none of them are shown) and the like, and a reception section B provided with a speaker (not shown), a crystal display portion C and the like. The transmission section A and the reception section B are turnably connected to each other through the hinge assembly 1 about a rotation axis L.

A pair of resin-made receiving cylindrical portions A1, A1 are disposed at an end portion of the transmission section A on the side of the reception section B. The pair of receiving cylindrical portions A1, A1 are arranged at left and right side portions with their axes aligned with the rotation axis L. On the other hand, a pair of resin-made receiving cylindrical portions B1, B1 are disposed at an end portion of the reception section B on the side of the transmission section A. The pair of receiving cylindrical portions B1, B1 each have an inside diameter and an outside diameter which are equal to an inside diameter and an outside diameter of the receiving cylindrical portion A1, respectively. The pair of receiving cylindrical portions B1, B1 are arranged such that they are generally in contact with inner end faces of the respective receiving cylindrical portions A1, A1 and their axes are aligned with the rotation axis L. By inserting the hinge assembly 1 according to the present invention in the mutually adjacent two receiving cylindrical portions A1, B1, the transmission section A and the reception section B are turnably connected to each other about the rotation axis L. The turning range of the transmission section A and the reception section B is set between a closed position where the front faces (left faces in FIG. 12(B)) of the transmission section A and the reception section B are in abutment relation and an open position (position turned about 160 degrees from the closed position) shown in FIG. 12.

In the case of this embodiment, although the same hinge assembly 1 is inserted in each of the two sets of receiving cylindrical portions A1, B1, it is also accepted that the hinge assembly 1 is inserted in only one of the two sets of receiving cylindrical portions A1, B1 and a different hinge assembly or a bearing for merely turnably connecting the receiving cylindrical portions A1, B1 is inserted in the other set.

As shown in FIGS. 10 and 11, a pair of key portions A2, A2 are formed in the inner peripheral surface of the receiving cylindrical portion A1. The pair of key portions extend from one end to the other end of the receiving cylindrical portion A1 along the axis of the receiving cylindrical portion A1 and are arranged 180 degrees away from each other in the circumferential direction. An annular projection B2 is formed on the inner peripheral surface of the other receiving cylindrical portion B1. This annular projection B2 is formed at the end portion on the opposite side of the receiving cylindrical portion A1. Moreover, a pair of key portions (abutment projections) B3, B3 are formed on the inner peripheral surface of the receiving cylindrical portion B1. The pair of key portions B3, B3 extend from the annular projection B2 to a generally central portion of the receiving cylindrical portion B1 in the axial direction and are arranged 180 degrees away from each other in the circumferential direction of the receiving cylindrical portion B1. The pair of key portions B3, B3 are arranged such that they are aligned with the key portions A2, A2, when the angle formed between the transmission section A and the reception section B is brought to be a value, for example, 170 degrees, which is slightly larger than the angle formed therebetween in the open position. However, the key portion B3 is set slightly larger in width in the circumferential direction and in height than the key portion A2.

Next, the hinge assembly 1 will be described. As shown in FIGS. 3, 4 and 6 through 8, the hinge assembly 1 comprises a hinge main body 2, a movable member 3, a turnable member 4, a driver member 5, a connection shaft 6 and a coiled spring 7 (bias means).

Figure 1:
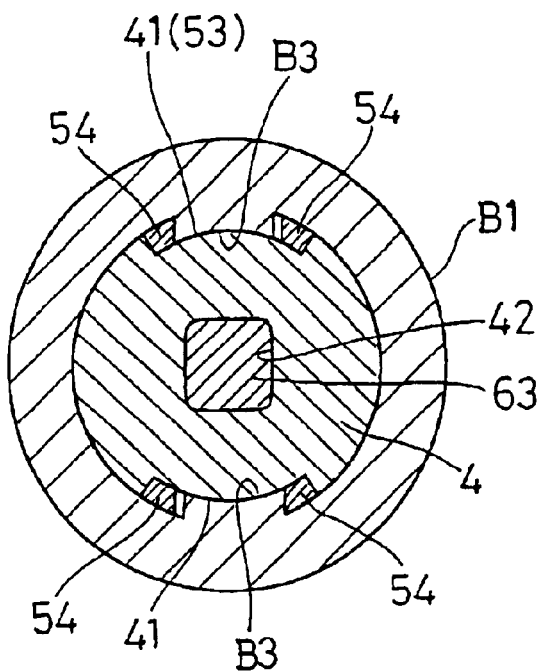
FIG. 1 is a view showing one embodiment according to a first aspect of the present invention and is a sectional view taken on line X—X of FIG. 6.
Figure 2:
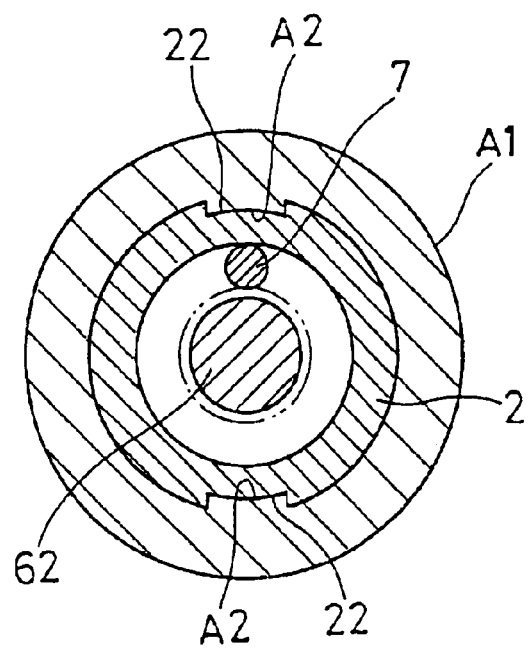
FIG. 2 is a sectional view taken on line Y—Y of FIG. 6.
Figure 3:
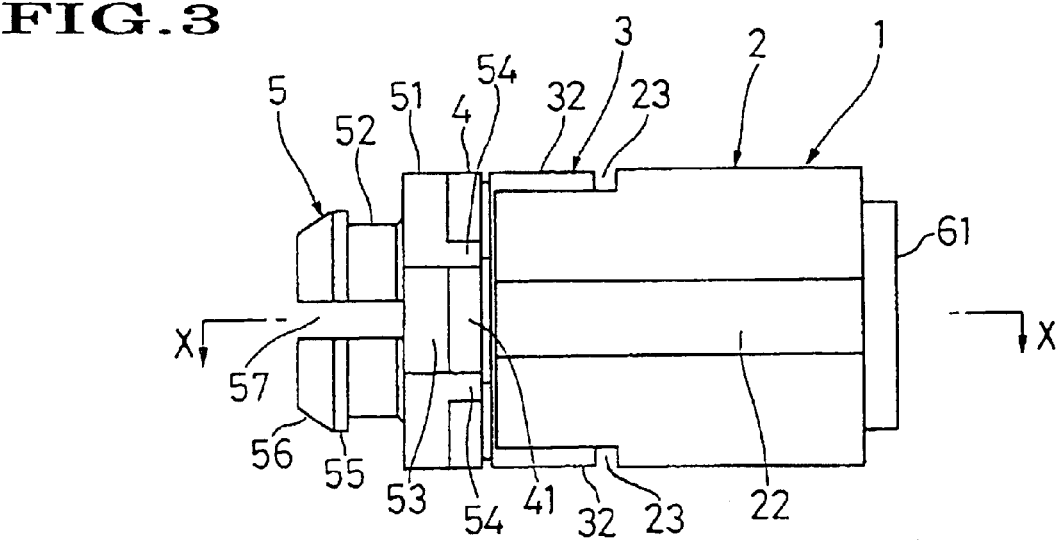
FIG. 3 is a front view showing a hinge assembly according to the present invention.
Figure 4:
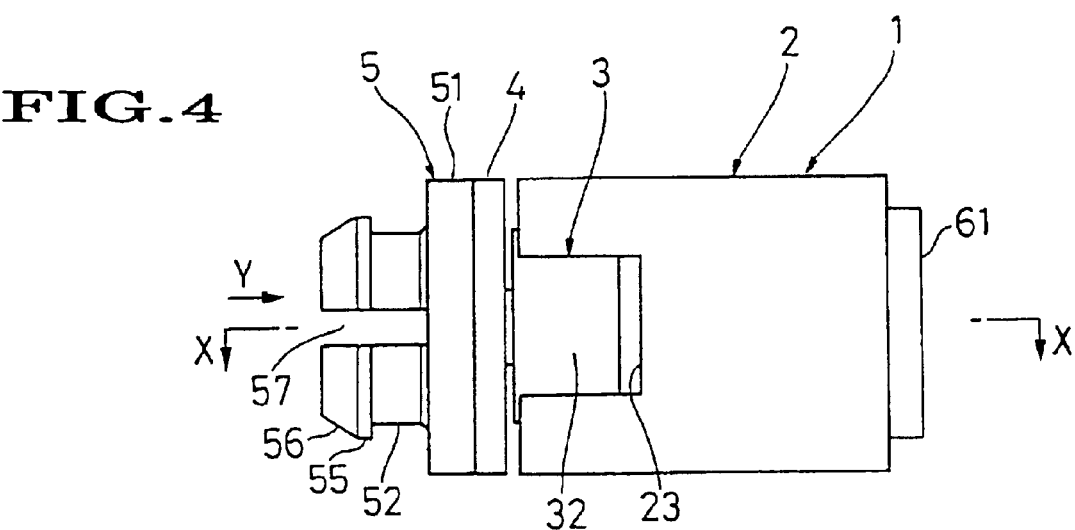
FIG. 4 is a plan view of the above hinge assembly.
Figure 5:
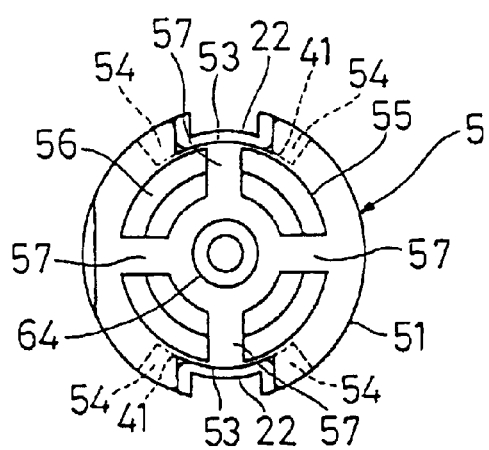
FIG. 5 is a view when viewed in a direction as indicated by an arrow Y of FIG. 4.
Figure 6:
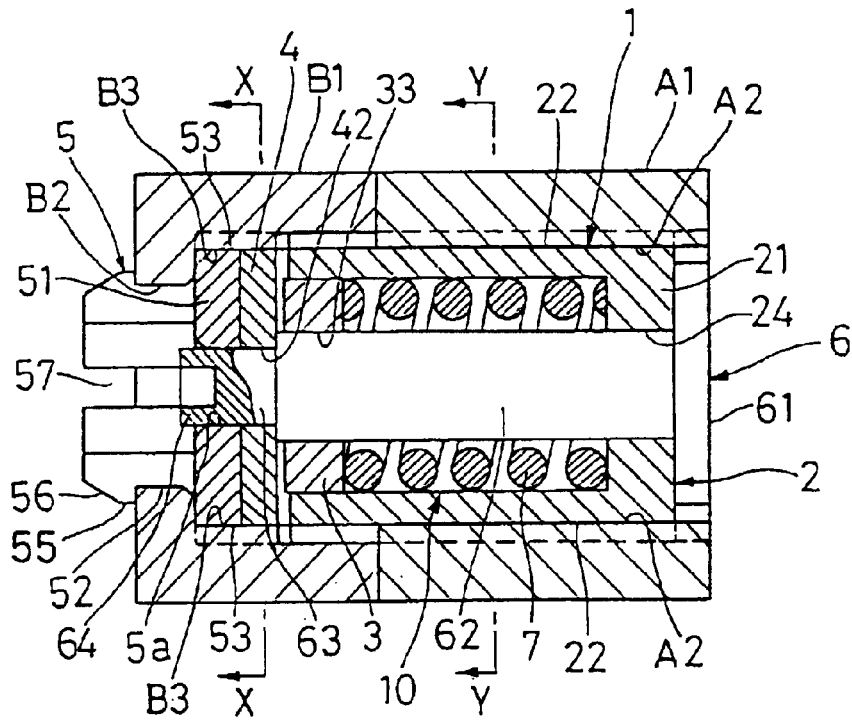
FIG. 6 is a sectional view taken on line X—X of FIG. 3, showing a state of the hinge assembly inserted in an insertion cylindrical portion of a cellular telephone.
Figure 7:
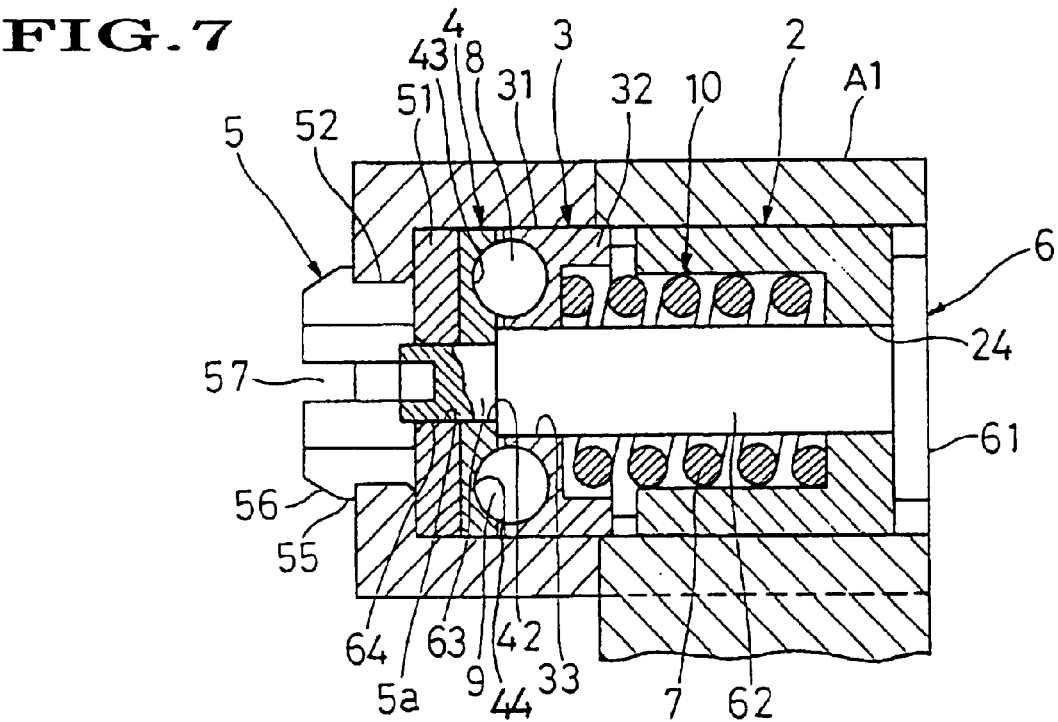
FIG. 7 is a sectional view taken on line X—X of FIG. 4, showing a state of the hinge assembly inserted in an insertion cylindrical portion of a cellular telephone.

The hinge main body 2 is formed as a bottomed cylindrical body having a bottom portion 21 at one end (right end in FIGS. 6 and 7) and being open at the other end. The outside diameter of the hinge main body 2 is generally equal to the inside diameter of the receiving cylindrical portions A1, B1. A pair of key grooves 22, 22 are formed in the outer peripheral surface of the hinge main body 2. The pair of key grooves 22, 22 extend from one end of the hinge main body 2 to the other end along the axis of the hinge main body 2 and are arranged 180 degrees away from each other in the circumferential direction of the hinge main body 2. As shown in FIGS. 1, 6 and 7, the hinge main body 2 is fitted to the receiving cylindrical portion A1 and the key portions A2, A2 are fitted to the key grooves 22, 22. By doing so, the hinge main body 2 is non-turnably connected to the transmission section A. Moreover, the portion of the main body 2 having a length about ¼ the entire length from the left end is turnably fitted to an end portion (end portion where no key portion B3 is formed) of the receiving cylindrical portion B1 on the side of the receiving cylindrical portion A1. By this, the receiving cylindrical portion A1 and the receiving cylindrical portion B1 are turnably connected to each other through the hinge main body 2, and therefore, the transmission section A and the reception section B are turnably connected to each other through the hinge main body 2.

The movable member 3 is molded from resin. It includes a disc portion 31, and a pair of guide portions 32, 32 formed on the outer peripheral surface of the disc portion 31. This disc portion 31 is slidingly movably fitted to the inner periphery of the other end portion (left end portion in FIGS. 6 and 7) of the hinge main body 2. The pair of guide portions 32, 32 are arranged 180 degrees away from each other in the circumferential direction of the disc portion 31 and slidingly movably inserted in the guide grooves 23, 23, respectively which are formed in the other end portion of the hinge main body 2. Owing to this arrangement, the movable member 3 is connected to the hinge main body 2 such that the movable member 3 is movable in a direction of the axis of the hinge main body 2 but non-turnable.

The turnable member 4 is made of metal and has a disc-like configuration. The turnable member 4 is arranged with its axis aligned with the rotation axis L and generally in contact relation with the end face of the hinge main body 2 on the open side. Accordingly, the turnable member 4 is in opposing relation with the movable member 3. A pair of key grooves (abutment recesses) 41, 41 are formed in the outer peripheral surface of the turnable member 4. The pair of key grooves 41, 41 are arranged such that they transverse the turnable member 4 in a direction of the axis of the turnable member 4 and they are 180 degrees away from each other in the circumferential direction. It is set such that the width of the key groove 41 in the circumferential direction is extensively larger than that of the key portion B3 and the depth of the key groove 41 is generally equal to that of the key portion B3.

The driver member 5 is molded from resin. It includes a disc portion 51 whose axis is aligned with the rotation axis L, and a cylindrical portion 52 extending forward from a central portion of that end portion of the disc portion 51 which is located on the opposite side of turnable member 4. The disc portion 51 has a same outside diameter as the turnable member 4. The disc portion 51 is arranged such that it is in contact with the left side (opposite side of the movable member 3) end face of the turnable member 4. A pair of key grooves 53, 53 are formed in the outer peripheral surface of the disc portion 51. The pair of key grooves 53, 53 are arranged 180 degrees away from each other in the circumferential direction. Key portions B3, B3 are inserted in the corresponding key grooves 53, 53. The width of each key groove 53 in the circumferential direction is slightly larger than the width of the key portion B3 in the circumferential direction. Accordingly, the driver member 5 is turnable by a fine angle which corresponds to the difference in width between the key groove 53 and the key portion B3, with respect to the receiving cylindrical portion B1 and thus, with respect to the reception section B. Of course, after the side surface of the key portion B3 orienting in the turning direction of the receiving cylindrical portion B1 is collided with the side surface of the key groove 53, the driver member 5 is turned in unison with the reception section B.

Two pairs of abutment projections 54, 54, each pair consisting of two pieces, are formed on the outer side portion of the opposing surface of the disc portion 5 with respect to the turnable member 4. Each pair of abutment projections 54, 54 are arranged such that they are located on opposite sides of the key groove 53. The outer peripheral surface of each abutment projection 5 is flush with the outer peripheral surface of the disc portion 51, and the radius of curvature of the inner peripheral surface of the abutment projection 54 is equal to that of the bottom surface of the key groove 53. Moreover, the distance between the outer side surfaces of the two abutment projections 54, 54 in the circumferential direction is equal to the width of the key groove 41 of the turnable member 4 in the circumferential direction, and the length (length in a direction of the rotation axis L) of the abutment projection 54 is generally equal to the thickness of the turnable member 4. Accordingly, as shown in FIG. 1, the two abutment projections 54, 54 can be inserted respectively in the opposite end portions of a key groove 41 in the circumferential direction, and in a state of insertion, the end faces of the abutment projections 54, 54, which are away from each other in the circumferential direction, are in contact with the opposite side surfaces of the key groove 41, respectively. By this, the driver member 5 is non-turnably connected to the turnable member 4. As a consequence, the turnable member 4 is also turned in unison with the reception section B only excepting the above-mentioned fine angle.

The distance between the opposing inner side surfaces of the pair of abutment projections 54, 54 in the circumferential direction is equal to the width of the key groove 53 in the circumferential direction. As a consequence, the key groove 53 is as if increased in length to the extent corresponding to the length of the abutment projection 54, and the key portion B3 is fitted to the inner side surfaces of the pair of projections 54, 54. By this, the driver member 5 is more firmly non-turnably connected to the receiving cylindrical portion B1.

The cylindrical portion 52 of the driver member 5 has a generally same length as the annular projection B2. An annularly extending sandwichingly holding projection 55 is formed on the outer periphery of the distal end portion of the cylindrical portion 52. In addition, a tapered portion 56 further extending forward from the sandwichingly holding projection 55 is formed on the outer periphery of the distal end portion of the cylindrical portion 52. Moreover, a plurality (four in this embodiment) of slits 57 extending from the distal end of the cylindrical portion 52 to the disc portion 51 are formed in the cylindrical portion 52. Owing to formation of those slits 57, the distal end portion of the cylindrical portion 52 can be elastically deformed about the basal end portion and the annular projection 55 and the tapered portion 56 can be enlarged and reduced in diameter. Therefore, as shown in FIGS. 10 and 11, when the hinge assembly 1 is inserted into the receiving cylindrical portion B1 from the receiving cylindrical portion A1 first with the driver member 5, the tapered portion 56 is collided with an intersection portion between the inner end face and the inner peripheral surface of the annular projection B2 first. In that state, when the hinge assembly 1 is further inserted, the tapered portion 56 and the sandwichingly holding projection 55 are reduced in diameter as the insertion is progressed. When the sandwichingly holding projection 55 has passed the inside of the annular projection B2, the projection 55 is enlarged in diameter so as to have the original outside diameter As a consequence, as shown in FIGS. 6 and 7, the sandwichingly holding projection 55 and the disc portion 51 sandwichingly hold the annular projection B2 in a direction of the rotation axis L. By this, the hinge assembly 1 is positionally fixed to the receiving cylindrical portion B1 in a direction of the rotation axis L and hence, the hinge assembly 1 is positionally fixed to the receiving cylindrical portions A1, B1 (transmission section A, reception section B) in a direction of the rotation axis L.

In the state where the hinge assembly 1 is positionally fixed to the receiving cylindrical portion B1, the cylindrical portion 52 of the driver portion 5 is turnably fitted to the inner peripheral surface of the annular projection B2 with almost no gap therebetween. This also helps to turnably connect the receiving cylindrical portions A1, B1. Accordingly, fitting of the hinge main body 2 to the receiving cylindrical portion B1 is not absolutely required. On the contrary, when the hinge main body 2 is to be turnably fitted to the receiving cylindrical portion B1, it is also accepted that the cylindrical portion 2 is fitted to the annular projection with a gap therebetween.

Figure 8:
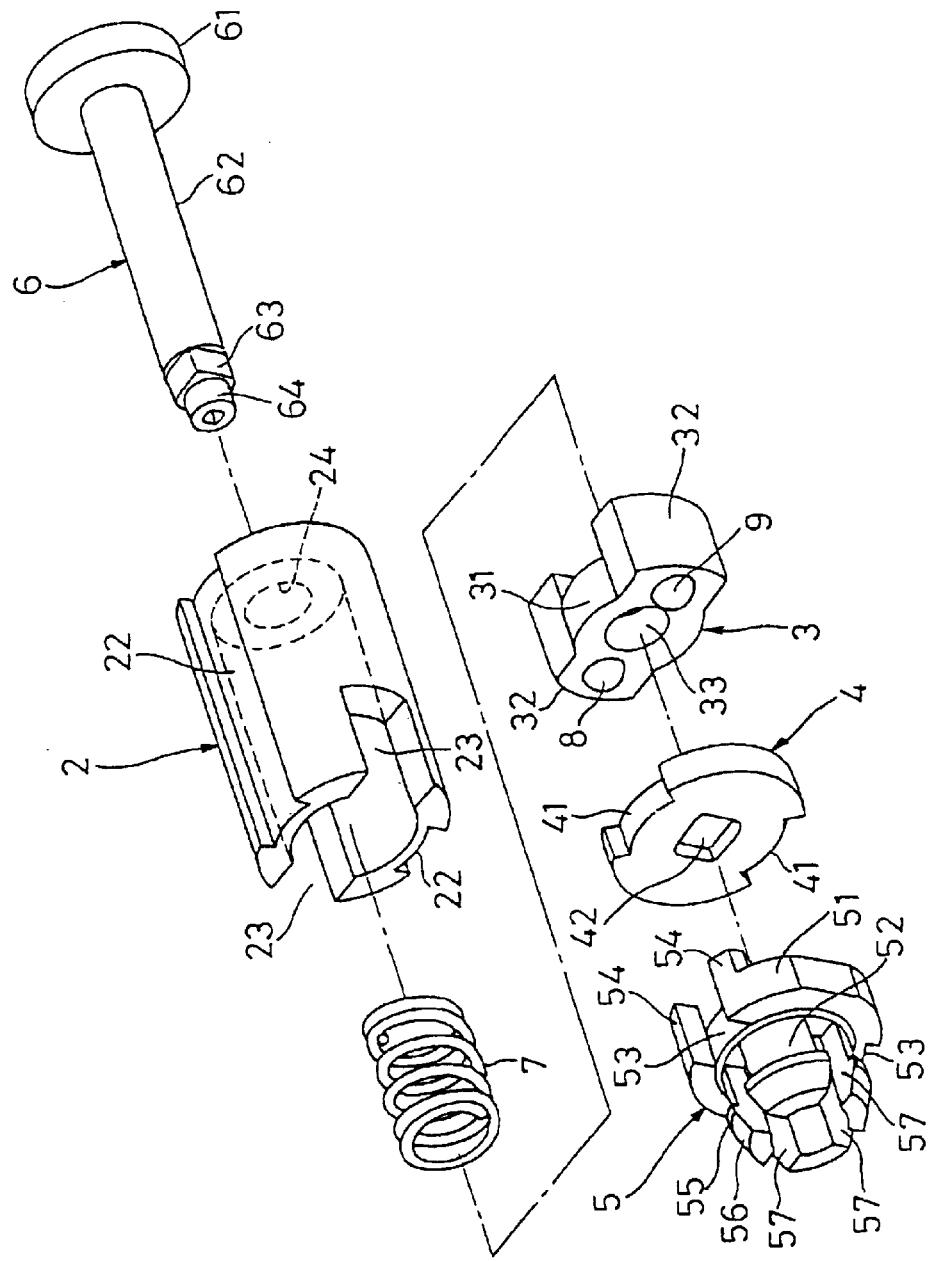
FIG. 8 is an exploded perspective view of the above hinge assembly.

The connection shaft 6 is arranged with its axis aligned with the rotation axis L. As shown in FIGS. 6 through 8, it includes a disc-like head portion 61, a shaft portion formed on a central portion of one end face of the head portion 61 and having a circular configuration in section, a fixed portion 63 formed on a distal end face of the shaft portion 62 and having a regular square configuration in section, and a caulking portion 64 formed on a distal end face of the fixed portion 63 and having a circular configuration in section. Of course, the various portions 61 through 64 of the connection shaft 6 are formed with their axes aligned to one another. The shaft portion 62 of the connection portion 6 is turnably and slidingly movably pierced through an insertion hole 24 formed in a central portion of the bottom portion 21 of the hinge main body 2, further pierced through the hinge main body 2, and further turnably and slidingly movably pierced through an insertion hole 33 formed in a central portion of the movable member 3. The length of the shaft portion 62 is dimensioned slightly longer than the length of the hinge main body 2. Accordingly, when the head portion 61 is abutted with the bottom portion 21, the distal end portion of the shaft portion 62 is slightly projected from the hinge main body 2, and the fixed portion 63 and the caulking portion 64 are projected from the end portion of the hinge main body 2 on its opening side. The fixed portion 63 is non-turnably fitted to an insertion hole 42 formed in a central portion of the turnable portion 4 and having a regular square configuration. The caulking portion 64 is fitted to an insertion hole 5a formed in a central portion of the disc portion 51 of the driver member 5. By caulking the caulking portion 64, the driver member 5 is fixed so as not to escape from the caulking portion 64. Moreover, since the driver member 5 is collided with the turnable member 4, the turnable member 4 is also fixed to the fixed portion 63 so as to escape. As a consequence, the head portion 61 of the connection shaft 6 and the turnable member 4 as if sandwichingly hold the hinge main body 2 (though a very small gap is present), thereby the entirety is integrated.

A coiled spring 7 is disposed between the inner periphery of the hinge main body 2 and the outer periphery of the shaft portion 61 of the connection shaft 6. This coiled spring 7 is disposed in a compressed state in a direction of the rotation axis L. One end of the coiled spring 7 is collided with the bottom portion 21 of the hinge main body 2 and the other end is collided with the movable member 3. Accordingly, the coiled spring 7 causes the movable member 3 to abut with the turnable member 4 by its biasing force.

A pair of metal-made balls 8, 9 are rotatably disposed at the abutment surface of the movable member 3 with respect to the turnable member 4. The pair of balls 8, 9 are arranged 180 degrees away from each other in the circumferential direction on a circumference about the rotation axis L. Instead of the balls 8, 9, a metal-made projection(s) having a semi-spherical configuration, for example, may be fixed to the movable member 3.

On the other hand, a pair of driver recesses 43, 44 are, as shown in FIGS. 9(A) and 9(B), formed in the abutment surface of the turnable member 4 with respect to the movable member 3. The driver recesses 43, 44 are arranged 180 degrees away from each other on the same circumference where the pair of balls 8, 9 are arranged. Accordingly, when the turnable member 4 is turned an appropriate angle through the reception section B, the pair of balls 8, 9 are brought into one of the driver recesses 43, 44. In this embodiment, when the turnable member 4 is turned about 160 degrees from the closed position where the reception section B is collided with the transmission section A, the balls 8, 9 are brought into the driver recesses 44, 43, respectively. Between the driver recesses 43, 44, the balls 8, 9 are rollingly moved within guide grooves 45, 46, which are formed on the same circumference where the driver recesses 43, 44 and the driver recesses 43, 44 are arranged.

As shown in FIG. 9(D), the depth of the driver recesses 43, 44 is slightly smaller than the radius of the balls 8, 9. The radius of curvature of the driver recesses 43, 44 in a section including the diameter line of the turnable member 4 is generally equal to the radius of the balls 8, 9. On the other hand, the radius of curvature of the driver recesses 43, 44 in a section of the turnable member 4 in the circumferential direction is, as shown in FIG. 9(C), greatly larger than the radius of the balls 8, 9. Thus, when the balls 8, 9 are offset in the circumferential direction from the centers of the driver recesses 43, 44, the bottom surfaces of the driver recesses 43, 44 convert the biasing force of the coiled spring 7 into a turn biasing force for turning the turnable member 4. That is, the bottom surfaces of the driver recesses 43, 44 act as a cam for converting the biasing force of the coiled spring 7 into a turn biasing force. Let's presume here that, in FIGS. 9(A), of the entire bottom surfaces of the respective driver recesses 43, 44, the portions located on the side as indicated by an arrow X from the center in circumferential direction serve as a first cam face (first cam portion) 43a, 44a, and those portions located on the side as indicated by an arrow Y serve as a second cam face (second cam portion) 43b, 44b. When the reception section B is located in the closed position where the front surface of the reception section B provided with the liquid crystal display portion C is collided with the front surface of the transmission section A provided with the control buttons, the balls 8, 9 are collided with the first cam faces 43a, 44a, respectively. In that state, the biasing force of the coiled spring 7 is converted, by the first cam faces 43a, 44a, into a turn biasing force for biasing the turnable member 4 in a direction (direction towards the closed position side from the open position side) as indicated by an arrow X of FIGS. 9(A) and 9(B). On the contrary, when the reception section B is located in the open position where the reception section B is turned about 160 degrees from the closed position, the balls 8, 9 are collided with the second face faces 44b, 43b, respectively. In that state, the biasing force of the coiled spring 7 is converted, by the second cam faces 43b, 44b, into a turn biasing force for biasing the turnable member 4 in a direction (direction towards the open position side from the closed position side) as indicated by an arrow Y. As apparent from the foregoing, the turn bias means 10 is constituted by the movable member 3, the coiled spring 7, the balls 8, 9, the first cam faces 43a, 44a and the second cam faces 43b, 44b.

When the hinge assembly 1 thus constructed is to be assembled in a cellular telephone, first, the reception section B is brought to a location where the reception section B is turned about 10 degrees from the open position shown in FIG. 12 further towards the open position side, i.e., the reception section B is brought to a location where the reception section B is turned about 170 degrees from the closed position. By doing so, the key portion A2 of the receiving cylindrical portion A1 and the key portion B3 of the receiving cylindrical portion B1 are linearly arranged side by side. On the other hand, with respect to the hinge assembly 1, the balls 8, 9 are brought to generally central portions of the driver recesses 44, 43 and the key grooves 22, 41, 53 are linearly arranged side by side. Thereafter, as shown in FIGS. 10 and 11, the positions of the key grooves 22, 41, 53 in the circumferential direction are brought into coincidence with the key portions A2, A3, and the hinge assembly 1 is sequentially inserted into the receiving cylindrical portions A1, B1 from the receiving cylindrical portion A1 side first with the driver member 5.

When the hinge assembly 1 is inserted into a predetermined position, the key portion A2 is fitted to the key groove 22, thereby the hinge main body 2 is non-turnably fitted to the receiving cylindrical portion A1. Moreover, a part of the hinge main body 2 is turnably fitted to the receiving cylindrical portion B1. By this, the receiving cylindrical portions A1, B1 are turnably connected to each other and thus, the transmission section A and the reception section B are turnably connected to each other. Moreover, fitting of the key portion B3 to the key groove 53 causes the driver member 5 to be non-turnably fitted to the receiving cylindrical portion B1 only excepting a predetermined fine angle. As a consequence, the turnable member 4 is non-turnably connected to the reception section B only excepting a fine angle. By sandwiching holding the annular projection B2 of the receiving cylindrical portion B1 between the disc portion 51 and the sandwichingly holding projection 55 of the driver member 5, the hinge assembly 1 is fixed to the receiving cylindrical portions A1, B1, thereby the transmission section A and the reception section B cannot be separated from each other. After the hinge assembly 1 is inserted into the receiving cylindrical portions A1, B1 in the manner as mentioned above, the reception section B is turned about 10 degrees towards the closed position side so as to be located in the open position. Thereafter, a stopper (not shown) is provided between the transmission section A and the reception section B so that the reception section B is prevented from turning from the closed position side towards the open position side beyond the open position. By this, the attachment of the hinge assembly 1 is completed.

In the cellular telephone in which the hinge assembly 1 is assembled in the manner as described above, it is presumed here that the reception section B is located in the closed position. In the closed position, the biasing force of the coiled spring 7 is converted into a turn biasing force by the turn bias means 10, i.e., first cam faces 43a, 44a. By this turn biasing force, the turnable member 4 is turn biased in a direction from the open position side towards the closed position side and the reception section B is biased in the same direction through the driver member 5. By this, the reception section B is retained in the closed position where the reception section B is collided with the transmission section A.

Figure 9:
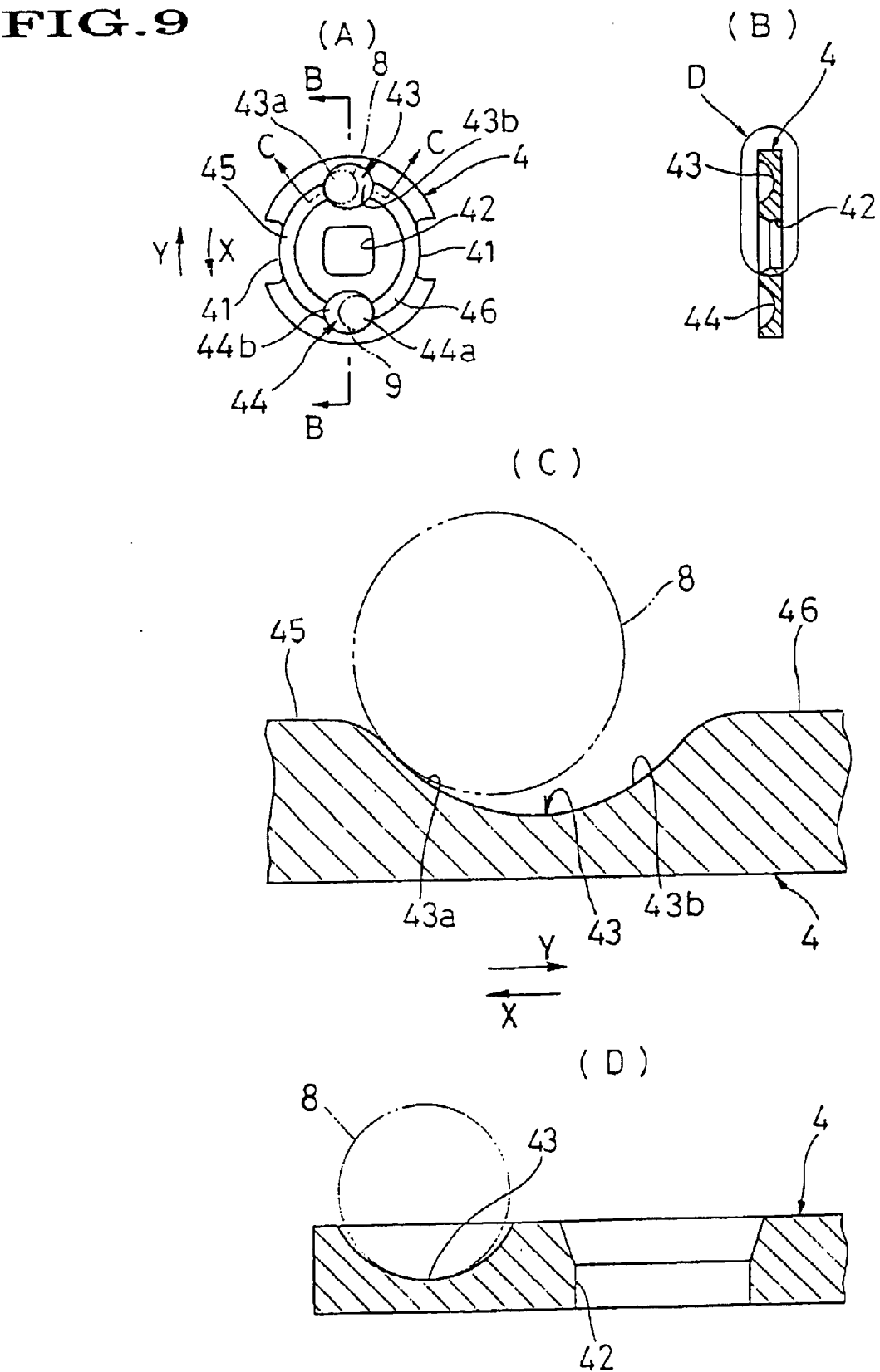
FIG. 9 is an illustration showing a turnable member used in the above hinge assembly.

When the reception section B located in the closed position is to be brought into the open position, the reception section B is manually turned towards the open position side (in a direction as indicated by an arrow Y of FIG. 9). In that case, as long as the balls 8, 9 are in contact with the first cam faces 43a, 44a, the reception section B is turned towards the open position side against the biasing force of the turn bias means 10. When the reception section B is turned towards the open position side, the key portion B3 is collided with that side surface of the key groove 53 which is oriented towards the closed position side. As a consequence, the turnable member is turned in a direction as indicated by an arrow Y of FIG. 9(A) together with the reception section B. When the balls 8, 9 are brought out of the driver recesses 43, 44 in accordance with the turning motion of the turnable member 4, the turn biasing force of the turn bias means 10 does not act. Accordingly, the reception section B is turned towards the open position side against the rotation friction of the balls 8, 9 which are rollingly moved within the guide grooves 45, 46. When the reception section B arrives at the vicinity of the open position and the balls 8, 9 are contacted with the second face faces 44b, 43b, respectively, the turnable member 4 is rapidly turned towards the open position side by the difference in width between the key portion B3 and the key groove 53 under the effect of the turn biasing force of the turn bias means 10. As a consequence, that side surface of the two side surfaces of the key groove 53 which is oriented towards the open position side is collided with the key portion B3. By this, a click sound is generated. Accordingly, even if the reception section B is turned at a low speed, a click sound can surely be generated. Moreover, since the resin-made abutment projection 54 is collided with the key portion B3 without allowing the metal-made turnable member 4 to collide with the key portion B3, the reception section B and the receiving cylindrical portion B1, which are made of resin, can be prevented from getting worn out soon. Thereafter, when the reception section B is turned into the open position through the turnable member 4, the reception section B is collided with the stopper and stopped, thus being prohibited from being turned further towards the open position side from the closed position side. By this, the reception section B is retained in the open position.

On the contrary, when the reception section B located in the open position is to be brought into the closed position, the reception section B is turned from the open position side towards the closed position side. In that case, for the first increment of time of the turning movement in which the turning angle is within a predetermined angular range from the open position towards the closed position side, the reception section B is turned against the biasing force of the turn bias means 10 as in the case for turning the reception section B towards the open position side. When the reception section B arrives at the vicinity of the closed position and the balls 8, 9 are contacted with the first cam faces 43a, 44a of the driver recesses 43, 44, the turnable member 4 is rapidly turned in a direction (direction as indicated by an arrow X) from the open position side towards the closed position side by the turn biasing force of the turn bias means 10. As a consequence, the driver member 5, which is non-turnably connected to the turnable member 4, is also rapidly turned in a direction as indicated by the arrow X and that side surface of the key groove 53 orienting towards the closed position side is collided with a side surface of the key portion B3. By this, a click sound is generated. Thereafter, when the turnable member 4 is further turned towards the closed position side by the bias means 7 and the reception section B arrives at the closed position, the reception section B is collided with the transmission section A, thus prohibiting the reception section B from further turning in a direction from the open position side towards the closed position side. By this, the reception section B is retained in the closed position.

Next, one embodiment according to a second aspect of the present invention will be described with reference to FIGS. 13 through 17. In this embodiment, only the different constitution from the above embodiment will be described. Like parts of the above embodiment are denoted by like reference numerals and description thereof is omitted.

Figure 15:
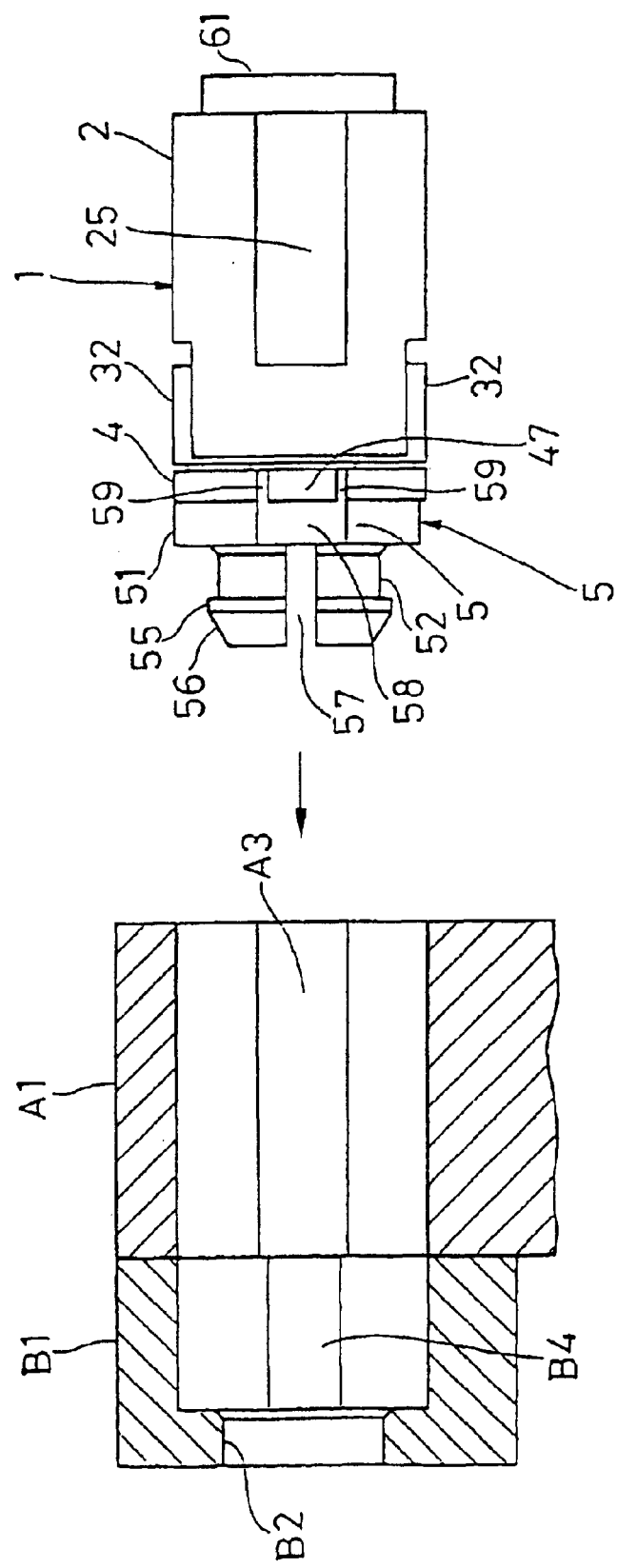
FIG. 15 is a view, like FIG. 10, showing the above embodiment.
Figure 16:
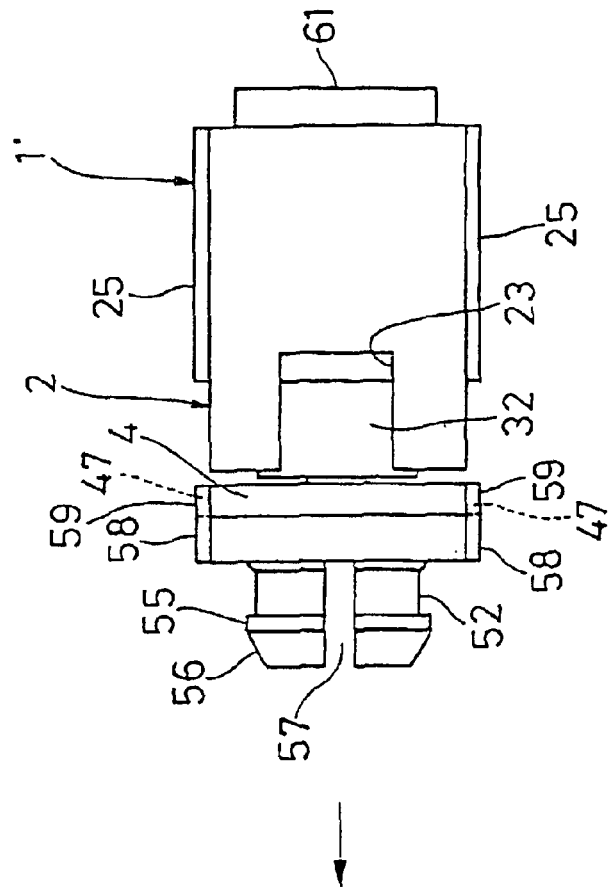
FIG. 16 is a view, like FIG. 11, showing the above embodiment.
Figure 16:
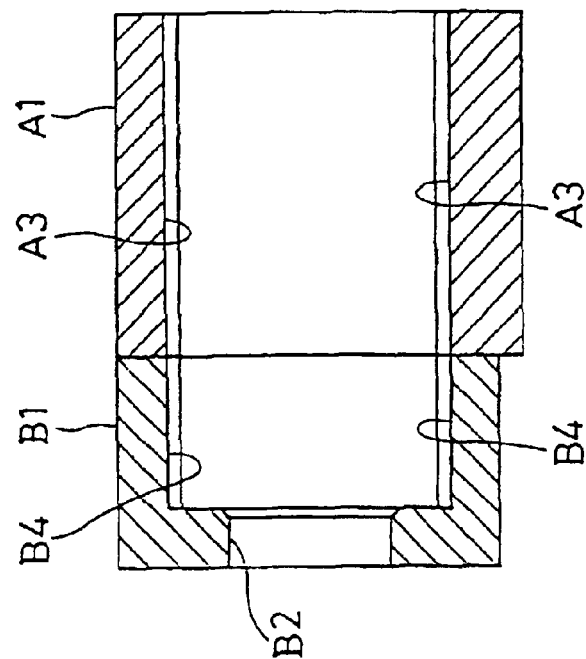
Figure 17:
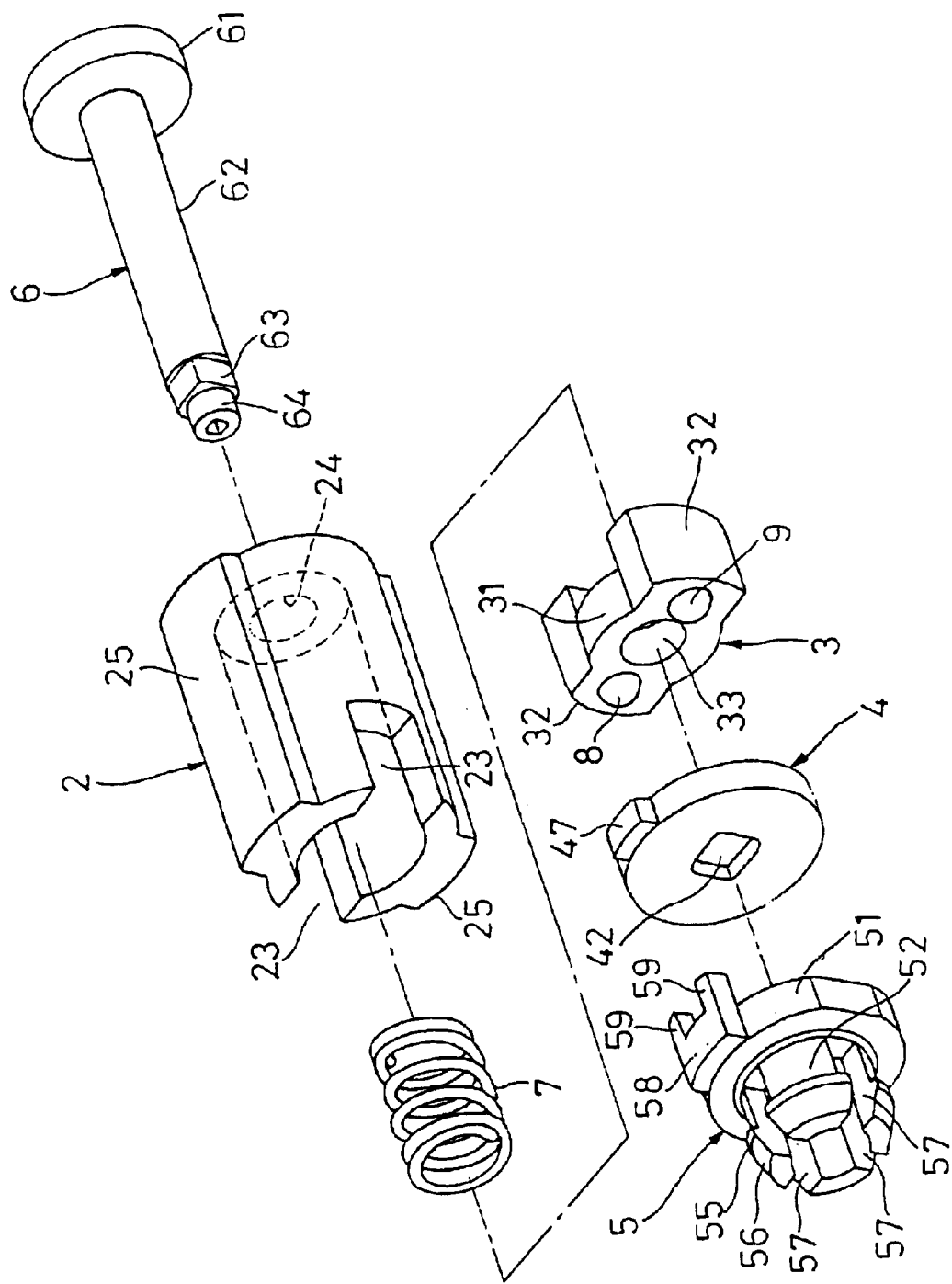
FIG. 17 is an exploded perspective view showing the above embodiment.
Figure 18:
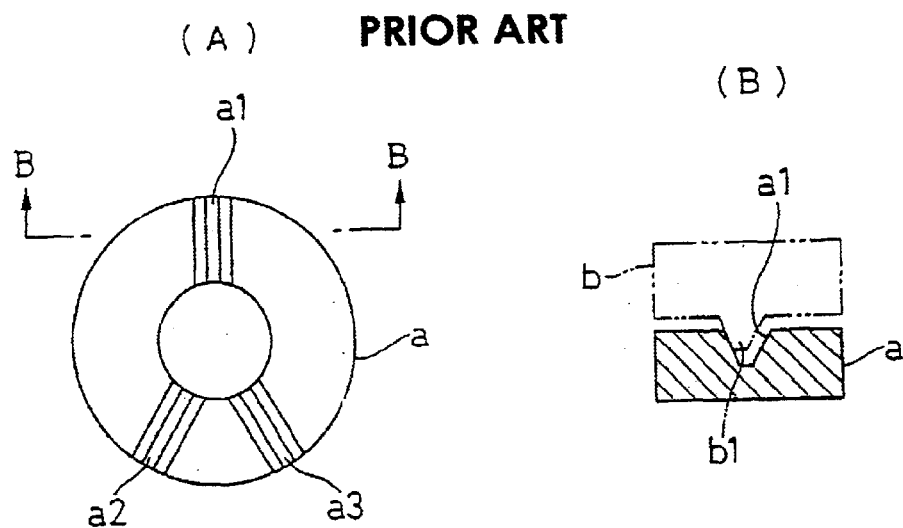
FIG. 18 is an illustration showing a hinge main body in a conventional hinge assembly.
Figure 19:
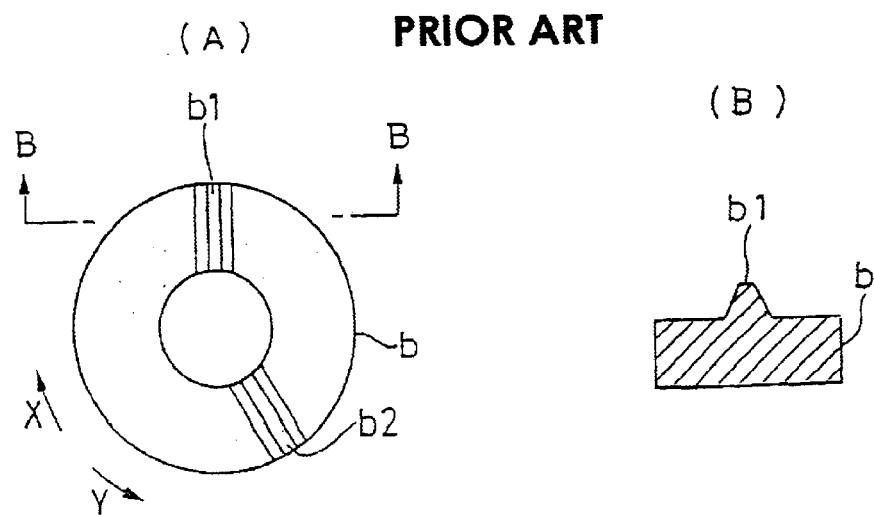
FIG. 19 is an illustration showing a turnable member in a conventional hinge assembly.

In a cellular telephone of this embodiment, as shown in FIGS. 15 and 16, a key groove A3 instead of the key portion A2 is formed in the receiving cylindrical portion A1, and a key groove (abutment recess) B4 instead of the key portion B3 is formed in the inner peripheral surface of the receiving cylindrical portion B1. The key groove B4 is set to be slightly smaller in width in the circumferential direction and in depth than the key groove A3. Moreover, the key groove B4 extends from the annular projection B2 to the end face of the receiving cylindrical portion B1 on the side of the receiving cylindrical portion A1.

On the other hand, a pair of key portions 25, 25 instead of the pair of key grooves 22, 22 are formed on the outer peripheral surface of the hinge main body 2 of a hinge assembly 1'. The fitting of the key portions 25, 25 to the key grooves A3, A3 of the receiving cylindrical portion A1, respectively, causes the hinge main body 2 to be non-turnably connected to the receiving cylindrical portion A1 and thus to the transmission section A. The key portion 25 is not formed on that area where the hinge main body 2 is inserted in the receiving cylindrical portion B1. Accordingly, also in this embodiment, the transmission section A and the reception section B are turnably connected to each other through the hinge main body 2.

A pair of key portions (abutment projections) radially projection from the outer peripheral surface, instead of the pair of key grooves 41, are formed on the outer peripheral surface of the turnable member 4. The width of the key portion 47 in the circumferential direction is set to be smaller than the width of the key groove B4.

A pair of key portions (support projections) radially projecting from the outer peripheral surface, instead of the pair of key grooves 53, 53, are formed on the outer peripheral surface of the disc portion 51 of the driver member 5. The outer peripheral surface of the key portion 58 has a same radius of curvature as the outer peripheral surface of the key portion 47. A pair of fitting projections 59, 59 projecting towards the turnable member 4 side are formed on the opposite sides of that end face of each key portion 58 which is oriented towards the turnable member 4 side. The outer peripheral surfaces of the pair of fitting projections 59, 59 have a same radius of curvature as the outer peripheral surface of the key portion 58. Moreover, the interval between the pair of fitting projections 59, 59 in the circumferential direction is set to be equal to the width of the key portion 47 in the circumferential direction, and the length thereof in a direction of the rotation axis L is set to be generally equal to the thickness of the turnable member 4 in the same direction. Accordingly, the key portion 47 is tightly fitted between the pair of fitting projections 59, 59, and the pair of fitting projections 59, 59 are in contact with the opposite side surfaces of the key portion 47, respectively. By this, the fixed member 5 is relatively non-turnably connected to the turnable member 4.

The side surfaces of the pair of fitting projections 59, 59 which are located on the side away from each other in the circumferential direction, are coplanar with the opposite side surfaces of the key portion 58 in the circumferential direction. As a consequence, the key portion 58 is as if increased in length to the extent corresponding to the length of the fitting projections 59, 59. The width (width between the side surfaces of the pair of fitting projections 59, 59 which are away from each other) of the key portion 58 in the circumferential direction is set to be slightly smaller than the width of the key groove B4. Accordingly, the fixed member 5 and the turnable member 4 is turnable by a fine angle which corresponds to the difference in width between the key portion 58 and the key groove B4, with respect to the receiving cylindrical portion B1. When the reception section B is turned into the closed position or open position, the key portion 58 and the fitting projections 59, 59 are collided with the side surface of the key groove B4 at a high speed as in the above-mentioned embodiment. By this, a click sound is generated. Moreover, since the driver member 5 is formed of resin and thus, the key portion 58 and the fitting projection 59 are formed of resin, the key portion B4 of the receiving cylindrical portion B1 can be prevented from getting worn out soon.

INDUSTRIAL APPLICABILITY

A hinge assembly according to the present invention can be used as a hinge assembly for turnably connecting a main body and a cover member to each other, of a cellular telephone, a personal computer, and the like.

What is claimed is:

1. A hinge assembly comprises, in order to turnably connect an equipment main body (A) and a cover member (B) between a closed position and an open position:

a hinge main body (2) non-turnably connected to one of said equipment main body (A) and said cover member (B);

a turnable member (4) arranged on a rotation axis (L) of said equipment body (A) and said cover member (B), turnably connected to the other of said equipment main body (2) and said cover member (B), and turnably connected to said hinge main body (2); and turn bias means (10) disposed between said hinge main body (2) and said turnable member (4), said turn bias means (10) biasing, when said cover member (B) is located within a predetermined angular range from the closed position towards the open position side, said turnable member (4) from the open position side towards the closed position side and biasing, when said cover member (B) is located within a predetermined angular range from the open position towards the closed position side, said turnable member (4) from the closed position side towards the open position side;

an abutment recess (41) being formed in an outer periphery of said turnable member (4);

an abutment projection (B3), which is to be inserted in said abutment recess (41), being formed on the other of said equipment main body (A) and said cover member (B) to which said turnable member (4) is connected;

wherein a driver member (5) is disposed adjacent to said turnable member (4) in a direction of the rotation axis (L);

a pair of abutment projections (54, 54) for non-turnably connecting said driver member (5) to said turnable member (4) by being collided with opposite wide surfaces of said abutment recess (41) in the circumferential direction are formed on said driver member (5) in such a manner as to be away from each other in the circumferential direction about the rotation axis (L);

said abutment projection (B3) is inserted between said pair of abutment projection (54, 54), so that when said turnable member (4) is turned in the closing direction by said turn bias means (10), one (54) of said pair of abutment projections (54, 54) is abutted with said abutment projection (B3) thereby turning the other (B) of said equipment main body (A) and said cover member (B) to which said turning member (4) is connected, towards the closed position side, and when said turnable member (4) is turned in the opening direction by said turn bias means (10), the other (54) of said pair of abutment projections (54, 54) is abutted with said abutment projection (B3) thereby turning the other (B) of said equipment main body (A) and sad cover member (B) towards the open position side;

at least portions of said pair of abutment projections (54, 54) which are to be collided with said abutment projection (B3), are formed of resin; and an interval between said pair of abutment projections (54, 54) in the circumferential direction is set to be larger by a predetermined small amount than a width of said abutment projection (B3) in the circumferential direction.

2. A hinge assembly according to claim 1, wherein entirety of said driver member (5) is formed of resin.

3. A hinge assembly according to claim 1, wherein said turn bias means (10) comprises a movable member (3) placed opposite said turnable member (4) and disposed at said hinge main body (2) such that said movable member (3) is non-turnable but movable in a direction of the rotation axis (L) and bias means (7) for causing said movable member (3) to abut with said turnable member (4), a first cam portion (43a, 44a) for converting the biasing force of said bias means (7) into a turn biasing force for turning said turnable member (4) from the open position side to the closed position side when said cover member (B) is located within a predetermined angular range from the closed position towards the open position side and a second cam portion (43b, 44b) for converting the biasing force of said bias means (7) into a turn biasing force for turning said turnable member (4) from the closed position side to the open position side when said cover member (B) is located within a predetermined angular range from the open position towards the closed position side are disposed between said turnable member (4) and said movable member (3).

4. A hinge assembly comprises, in order to turnably connect an equipment main body (A) and a cover member (B) between a dosed position and an open position:

a hinge main body (2) non-turnably connected to one of said equipment main body (A) and said cover member (B);

a turnable member (4) arranged on a rotation axis (L) of said equipment body (A) and said cover member (B), turnably connected to the other of said equipment main body (2) and said cover member (B), and turnably connected to said binge main body (2); and turn bias means (10) disposed between said hinge main body (2) and said turnable member (4), said turn bias means (10) hissing, when said cover member (B) is located within a predetermined angular range from the closed position towards the open position side, said turnable member (4) from the open position side towards the closed position side and biasing, when said cover member (B) is located within a predetermined angular range from the open position towards the closed position side, said turnable member (4) from the closed position side towards the open position side;

a radially projecting abutment projection (47) being formed on an outer periphery of said turnable member (4);

an abutment recess (B4), which allows said abutment projection (47) to be inserted therein, being formed in the other of said equipment main body (A) and said cover member (B) to which said turnable member (4) is connected;

wherein a driver member (5) is disposed adjacent to said turnable member (4) in a direction of the rotation axis (L);

a radially projecting support projection (58) is formed on an outer periphery of said driver member (5) and a pair of abutment projections (59, 59) projecting towards said turn able member (4) side and for non-turnably connecting said driver member (5) to said turnable member (4) by being collided with opposite side surfaces of said abutment projection (47) in the circumferential direction are formed on opposite end portions of said support projection (58) in the circumferential direction;

said pair of abutment projections (59, 59) are inserted in said abutment recess (B4), so that when said tamable member (4) is turned in the closing direction by said turn bias means (10), one (59) of said pair of abutment projections (59, 69) is abutted with one side surface of said abutment recess (B4) in the circumferential direction thereby turning the other (B) of said equipment main body (A) and said cover member (B) to which said turning member (4) is connected, towards the closed position side, and when said turnable member (4) is turned in the opening direction by said turn bias means (10), the other (59) of said pair of abutment projections (59, 59) is abutted with the other side surface of said abutment recess (B4) thereby turning the other (B) of said equipment main body (A) and said cover member (B) towards the open position side;

at least portions of said pair of abutment projections (59, 69) which are to be collided with the side surfaces of said abutment recess (B4), are formed of resin; and an interval between the side surfaces of said pair of abutment projections (59, 59) which are away from each other in the circumferential direction is set to be smaller by a predetermined small amount than a width of said abutment recess (B4) in the circumferential direction.

5. A hinge assembly according to claim 4, wherein entirety of said driver member (5) is formed of resin.

6. A hinge assembly according to claim 4 wherein said turn bias means (10) comprises a movable member (3) placed opposite said turnable member (4) and disposed at said hinge main body (2) such that said movable member (3)

is non-turnable but movable in a direction of the rotation axis (L) and bias means (7) for causing said movable member (3) to abut with said turnable member (4), a first cam portion (43a, 44a) for converting the biasing force of said bias means (7) into a turn biasing force for turning said turnable member (4) from the open position side to the closed position side when said cover member (B) is located within a predetermined angular range from the closed position towards the open position side and a second cam portion (43b, 44b) for converting the biasing force of said bias means (7) into a turn biasing force for turning said turnable member (4) from the closed position side to the open position side when said cover member (B) is located within a predetermined angular range from the open position towards the closed position side are disposed between said turnable member (4) and said movable member (3).

7. A hinge assembly according to claim 2, wherein said turn bias means (10) comprises a movable member (3) placed opposite said turnable member (4) and disposed at said hinge main body (2) such that said movable member (3) is non-turnable but movable in a direction of the rotation axis (L) and bias means (7) for causing said movable member (3) to abut with said turnable member (4), a first cam portion (43a, 44a) for converting the biasing force of said bias means (7) into a turn biasing force for turning said turnable member (4) from the open position side to the closed position side when said cover member (B) is located within a predetermined angular range from the closed position towards the open position side and a second cam portion (43b, 44b) for converting the biasing force of said bias means (7) into a turn biasing force for turning said turnable member (4) from the closed position side to the open position side when said cover member (B) is located within a predetermined angular range from the open position towards the closed position side are disposed between said turnable member (4) and said movable member (3).

8. A hinge assembly according to claim S wherein said turn bias means (10) comprises a movable member (3) placed opposite said turnable member (4) and disposed at said hinge main body (2) such that said movable member (3) is non-turnable but movable in a direction of the rotation axis (L) and bias means (7) for causing said movable member (3) to abut with said turnable member (4), a first cam portion (43a, 44a) for converting the biasing force of said bias means (7) into a turn biasing force for turning said turnable member (4) from the open position side to the closed position side when said cover member (B) is located within a predetermined angular range from the closed position towards the open position side and a second cam portion (43b, 44b) for converting the biasing force of said bias means (7) into a turn biasing force for turning said turnable member (4) from the closed position side to the open position side when said cover member (B) is located within a predetermined angular range from the open position towards the closed position side are disposed between said turnable member (4) and said movable member (3).

* * * * *

UNITED STATES PATENT AND TRADEMARK OFFICE
CERTIFICATE OF CORRECTION

PATENT NO. : 6,832,411 B2
DATED : December 21, 2004
INVENTOR(S) : Koshikawa et al.

It is certified that error appears in the above-identified patent and that said Letters Patent is hereby corrected as shown below:

Column 15,
Line 10, replace the word "wide" with the word -- side --
Line 16, replace the word "projection" with the word -- projections --
Line 28, replace the word "sad" with the word -- said --
Line 62, replace the word "dosed" with the word -- closed --

Column 16,
Line 6, replace the word "hissing" with the word -- biasing --
Line 30, replace the words "turn able" with the word -- turnable --
Line 38, replace the word "tamable" with the word -- turnable --
Lines 41 and 54, replace the number "69" with the number -- 59 --

Column 18,
Line 8, replace the word "claim S" with the word -- claim 5 --

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO.    : 6,832,411 B2
DATED         : December 21, 2004
INVENTOR(S)   : Koshikawa et al.

It is certified that error appears in the above-identified patent and that said Letters Patent is hereby corrected as shown below:

<u>Title page,</u>
Item [73], Assignee, should read,
-- Sugatsune Kogyo Co., Ltd,
   NEC Corporation,
   Ohashi Technica, Inc. --.

Signed and Sealed this

Eleventh Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,832,411 B2  Page 1 of 1
APPLICATION NO. : 10/333098
DATED : December 21, 2004
INVENTOR(S) : Koshikawa et al.

It is certified that error appears in the above-identified patent and that said Letters Patent is hereby corrected as shown below:

This certificate supersedes Certificate of Correction issued April 11, 2006, should be vacated since no Certificate of Correction was granted for this patent number.

Signed and Sealed this

Seventh Day of November, 2006

JON W. DUDAS
*Director of the United States Patent and Trademark Office*